No. 878,324. PATENTED FEB. 4, 1908.
H. J. WINTER.
VIEW FINDER.
APPLICATION FILED OCT. 2, 1907.

Witnesses
Walter B. Payne.
Russell B. Griffith

Inventor
Henry J. Winter
By Church & Rich
Attorneys

UNITED STATES PATENT OFFICE.

HENRY J. WINTER, OF ROCHESTER, NEW YORK, ASSIGNOR TO EASTMAN KODAK CO., OF ROCHESTER, NEW YORK, A CORPORATION OF NEW YORK.

VIEW-FINDER.

No. 878,324.　　　Specification of Letters Patent.　　　Patented Feb. 4, 1908.

Application filed October 2, 1907. Serial No. 395,491.

*To all whom it may concern:*

Be it known that I, HENRY J. WINTER, of Rochester, in the county of Monroe and State of New York, have invented certain new and useful Improvements in View-Finders; and I do hereby declare the following to be a full, clear, and exact description of the same, reference being had to the accompanying drawings, forming a part of the specification, and to the reference-numerals marked thereon.

My present invention relates to view finders such as are employed in connection with photographic cameras and similar instruments and apparatus, for the purpose of ascertaining the direction of the focus thereof or to other ends and it has for its object to provide a cheap and efficient means for so mounting the finder upon its support as to render it available for use when the instrument to which it is attached is operated in different relative positions.

To these and other ends the invention consists in certain improvements and combinations of parts all as will be hereinafter more fully described, the novel features being pointed out in the claims at the end of the specification.

Figure 1:
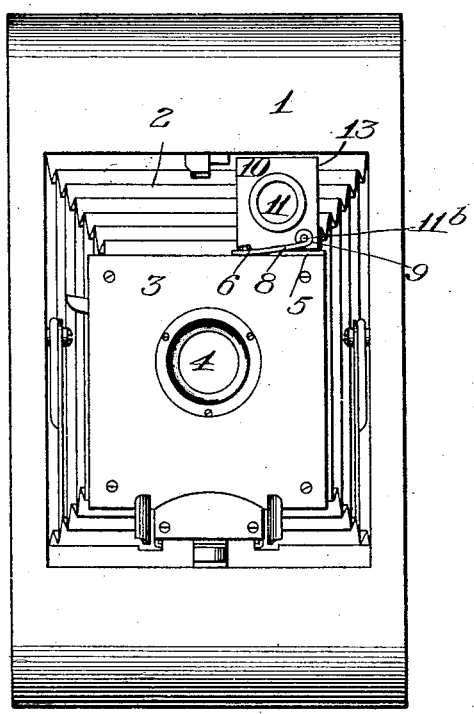
Figure 2:
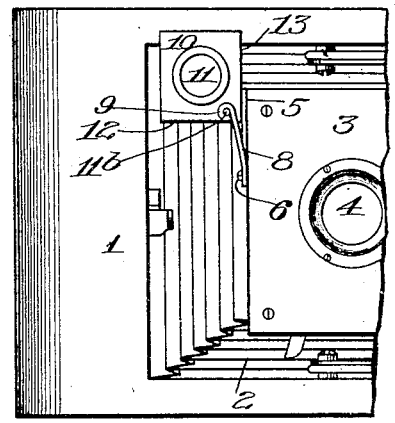
Figure 3:
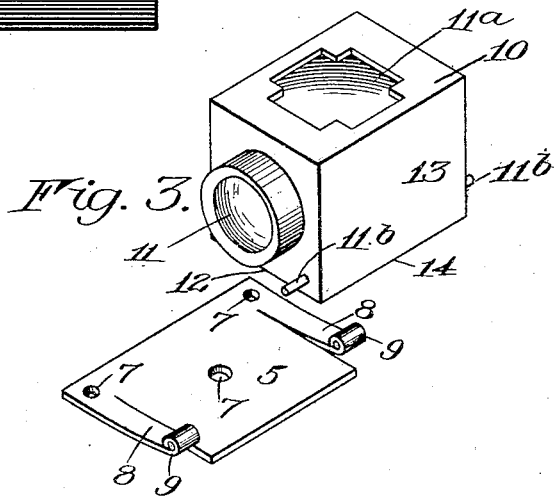

In the drawings: Figure 1 is a front elevation of a camera showing also in front elevation a finder attached thereto and embodying my improvements. Fig. 2 is a similar view with the finder adapted to another position of the camera and Fig. 3 is a detail perspective view showing collectively, the finder box and the supporting plate upon which it rests.

Similar reference numerals in the several figures indicate similar parts.

As a particular instance of the use of my improvements the invention is illustrated in the drawings embodied in a finder attached to a photographic camera of the type suited to making exposures upon films or plates of oblong shape in order that the dimensions of the negative will be greater in one direction than in the other to suit the corresponding extent of the image so that a larger reproduction of an object of considerable perpendicular height or horizontal breadth may be made upon a given area than would be otherwise possible all as is well known in the art. For the purposes in hand it will therefore be considered that the camera is to be held in the position shown in Fig. 1 to produce a negative of maximum vertical extent and in the position shown in Fig. 2 for one of maximum horizontal extent.

The camera itself may be of any desired form the one shown comprising generally a box or body 1 bellows 2 and lens front 3 carrying the lens 4. On one side of the lens front, and preferably at one corner thereof is secured a plate 5 as by screws 6 passing through apertures 7 in the plate. The latter is split transversely at different points and the separated portions struck up to form arms 8, the nature of the material of the plate being such as to render them yielding or resilient. Their outer ends are preferably formed over into eyes or otherwise fitted to constitute journal bearings 9.

The finder itself comprises preferably a box 10 having the usual objective and field lenses 11 and $11^a$. Adjacent the corresponding lower corners of the box and on the front and rear faces thereof are provided pivotal projections $11^b$ forming trunnions which enter and are supported in the bearings 9 at the ends of the arms bringing one face 12, the lower face of the box, in contact with the plate 5 as shown in Fig. 1 which may be assumed to be the normal position of the parts. The arms 8 are normally under tension holding the finder pressed against the supporting plate. The pivots $11^b$ are, however, arranged nearer to the under face 12 and a lateral face 13 than to the meeting edge 14 of said faces so that when it is desired to use the finder with the camera in the position shown in Fig. 2 the former is rotated about the pivots $11^b$ in the direction of the face 13 until the latter is in contact with the supporting plate 5. During the rotation of the box in this direction its pivot will be raised against the yielding tension of the spring arms, by reason of the contact of the more distant edge 14 with the plate, and lowered again. It will thus be seen that the said edge 14 retains the finder securely with either of the contact faces 12 or 13 adjacent to the support, as a change in its position can be made only against the tension of the said arms upon which the bearings are arranged.

Besides forming a cheap and simple means for constructing the yielding bearing the portion of the member 5 intermediate of the arms extends beneath the finder box and also acts as a wear plate for the sliding engagement of the edge 14.

I claim as my invention:

1. In a view finder, the combination with a support provided with yielding bearings, of a finder box, pivoted in said bearings having two contact faces adapted to rest alternately against the face of the support and provided with a portion engaging the latter as the box is rotated and arranged a greater distance from the pivot than either of said faces.

2. In a view finder, the combination with a support, of a pair of resilient arms carried thereby and a finder box pivoted to said arms having two contact faces adapted to rest alternately against the face of the support and provided with a portion engaging the latter as the box is rotated and arranged a greater distance from the pivot than either of said faces.

3. In a view finder, the combination with a supporting plate of elastic material having integral portions struck up therefrom to form resilient arms, of a finder box pivoted to said arms having two contact faces adapted to rest alternately against the face of the support and provided with a portion engaging the latter as the box is rotated and arranged a greater distance from the pivot than either of said faces.

4. The combination with a finder box, and pivots at opposite ends thereof, of a plate underlying said box and spring arms formed integrally with the ends of the plate and forming bearings for said pivots.

HENRY J. WINTER.

Witnesses:
   J. A. ROBERTSON,
   F. M. WARN.